United States Patent
Tychina

(10) Patent No.: US 9,055,108 B2
(45) Date of Patent: Jun. 9, 2015

(54) METHOD FOR INCREASING PERFORMANCE IN ENCAPSULATION OF TCP/IP PACKETS INTO HTTP IN NETWORK COMMUNICATION SYSTEM

(71) Applicant: Joint stock company "InfoTeCS", Moscow (RU)

(72) Inventor: Leonid Anatolievich Tychina, Moscow (RU)

(73) Assignee: Joint Stock Company "InfoTeCS", Moscow (RU)

( * ) Notice: Subject to any disclaimer, the term of this patent is extended or adjusted under 35 U.S.C. 154(b) by 0 days.

(21) Appl. No.: 13/938,809

(22) Filed: Jul. 10, 2013

(65) Prior Publication Data
US 2014/0143308 A1    May 22, 2014

(30) Foreign Application Priority Data
Nov. 16, 2012    (RU) .................................. 2012148627

(51) Int. Cl.
*G06F 15/16* (2006.01)
*H04L 29/06* (2006.01)

(52) U.S. Cl.
CPC .............. *H04L 69/169* (2013.01); *H04L 69/16* (2013.01)

(58) Field of Classification Search
CPC ............................... H04L 69/16; H04L 69/163
USPC .......................... 709/203, 227, 228, 232–235
See application file for complete search history.

(56) References Cited

U.S. PATENT DOCUMENTS

| 7,266,613 | B1* | 9/2007 | Brown et al. ................. 709/235 |
| 2005/0108411 | A1* | 5/2005 | Kliland et al. ................. 709/230 |

(Continued)

OTHER PUBLICATIONS

Article: Requirements for Internet Hosts—Communication Layers; Ineternet Engineering Task Force, R. Braden, Oct. 1989, pp. 1-116.

(Continued)

*Primary Examiner* — Wing F Chan
*Assistant Examiner* — Joseph Maniwang
(74) *Attorney, Agent, or Firm* — Honigman Miller Schwartz and Cohn LLP

(57) ABSTRACT

The disclosure relates to methods of transmitting data over TCP/IP through HTTP. The method includes establishing a connection between a client and a server through at least two proxies; generating a tunnel message in the client; sending the tunnel message to the server; choosing a delay value T based on a maximum transmission rate of the tunnel message; and determining a size Q of a dummy data packet by $$Q = \sum_{i=1}^{N-1} MSS_i,$$

where $MSS_i$ is a maximum segment size in TCP connections between the i-th proxy and the (i+1)-th proxy, and N is the number of proxies. The method also includes sending, from the client, a dummy data packet of size Q in T seconds after the last transmission of non-dummy data via the HTTP tunnel; receiving the tunnel message by the server; and disabling usage of Nagle's algorithm and TCP delayed acknowledgement algorithm for the TCP connection in the client and server.

1 Claim, 1 Drawing Sheet

(56) References Cited

U.S. PATENT DOCUMENTS

2008/0294793 A1* 11/2008 Han et al. ............... 709/235
2010/0005178 A1* 1/2010 Sindelaru et al. ........ 709/228
2011/0199899 A1* 8/2011 Lemaire et al. ......... 370/230.1
2013/0055287 A1* 2/2013 Pope et al. .............. 719/314

OTHER PUBLICATIONS

Article: Congestion Control in IP/TCP Internetworks; Ford Aerospace and Communications Corporation, John Nagle; Jan. 6, 1984, pp. 1-9.

* cited by examiner

METHOD FOR INCREASING PERFORMANCE IN ENCAPSULATION OF TCP/IP PACKETS INTO HTTP IN NETWORK COMMUNICATION SYSTEM

TECHNICAL FIELD

The disclosure relates to networking, in particular, to methods of transmitting data in digital communication networks over TCP/IP through HTTP.

BACKGROUND

In TCP/IP packet transmission of digital data through a HTTP connection, it is often required to increase data transmission rate. The problem of low transmission rate arises when TCP traffic is transmitted through a HTTP connection which also uses TCP; then, transmission rate decreases due to superposition of TCP delays of the two connections, thereby leading to the decreased speed of the TCP connection transmitted through the HTTP connection. This relates both to conventional connections and to connections in which source data packets are encrypted and the encrypted data is arranged in a standard form according to parameters of the employed protocols before subsequent transmission over a network (encapsulation).

This problem is resolved by various methods, including usage of capabilities available in the protocols used.

There is a known method for detecting usage of Nagle's algorithm in an established network connection, said method being implemented by a system comprising:

a network module built into a sender computer and adapted to:

establish a connection between the sender computer and a receiver computer;

receive and transmit network packets over a connection between the client and a server;

determining a size and forming a plurality of packets (segments) for transmission over the established connection;

detecting usage of Nagle's algorithm in the established connection;

disabling the usage of Nagle's algorithm for the established connection (See U.S. Pat. No. 7,970,864, IPC G06F 15/16).

The method comprises:

receiving, by the network module of the sender computer system, a request from a sending application to transmit data over a network connection to the receiver computer system;

generating, by the network module, one or more segments to be transmitted to the receiver computer system over the network connection;

determining, by the network module, whether the one or more segments to be transmitted are small segments, and whether reception of a previously transmitted small segment is acknowledged by the receiver computer;

if the previously transmitted small segment is not acknowledged by the receiver computer and at least one of the segments to be transmitted is a small segment, then detecting, by a Nagling detector in the sender computer system, usage of Nagle's algorithm in the network connection;

in response to detection of the usage of Nagle's algorithm in the network connection, transmitting, by the Nagling detector, a warning on the detected usage of Nagle's algorithm, the warning comprising both a signal for the receiver computer system and a signal for the sending application.

Particular embodiments of the method further provide for:

generating, by the sender computer system, one or more segments to be transmitted to the receiver computer system in response to the received data transmission request;

the determining by the sender computer system whether the one or more segments to be transmitted are small segments comprising determining, by the sender computer system, whether the one or more segments are smaller than a maximum segment size (MSS) for the network connection;

in response to detection of the usage of Nagle's algorithm in the network connection, disabling Nagle's algorithm for the network connection by the sender computer system.

However, the method does not provide for any solution to increase transmission rate in encapsulation of TCP/IP packets into HTTP.

Another known method for providing a maximum transmission unit of network packets is implemented in a system comprising:

a network module built into a client computer and adapted to:

establish a connection between the client computer and a server;

receive and transmit network packets on the connection between the client and the server;

perform encryption of network packets for the established connection;

adjust the maximum transmission unit of network packets, the method comprising:

establishing, by the network module, a connection between the client and the server, and performing, by the network module, encryption of a plurality of network packets for the connection;

receiving, by the network module from the server via the connection, a plurality of packets destined for the client, the plurality of network packets being transmitted to the server with the maximum unit size;

determining a packet size increment caused by encryption performed for each of the plurality of network packets;

adjusting the maximum transmission unit of the network packets relative to the size of a network packet from the plurality of network packets of the connection that has the largest size; and transmitting the plurality of network packets to the client via the connection in accordance with the adjusted maximum transmission unit (See U.S. Pat. No. 8,014,421, IPC H04J3/16).

In some embodiments, the method further comprises establishing a connection including a Secure Socket Layer (SSL) or a secure transport layer tunnel.

Furthermore, in implementation of the method, said adjusting of the maximum transmission unit of network packets may comprise determining a value of network throughput.

The above method is considered to be known.

However, the known method suffers from low data transmission rate if there are two or more proxy-servers (proxies) between the client computer and the server computer, since said method does not allow to prevent delays of encapsulated traffic in hops between the proxies.

SUMMARY

The object is to increase transmission (exchange) rate of a tunneled TCP connection implemented via at least two proxies.

The object is accomplished in a method for increasing performance that is implemented in a system comprising network modules built into a client computer and a server computer and adapted to:

establish a connection between the client computer and the server computer; receive and transmit network packets on the connection between the client and the server;

tunnel the network packets;

wherein at least two proxies connected to the client and the server are provided between the client and the server, the method comprising the steps of:

establishing, by the network modules, a connection between the client and the server, the connection being established via the at least two proxies;

generating a tunnel message in the client network module;

sending the tunnel message to the server;

choosing a delay value T based on a maximum transmission rate of the tunnel message;

determining a size Q of a dummy data packet by the formula:

$$Q = \sum_{i=1}^{N-1} MSS_i, \quad (1)$$

where $MSS_i$ is the maximum segment size in TCP connections between the i-th proxy and the (i+1)-th proxy, N is the number of proxies;

sending, from the client, a dummy data packet of the size Q in T seconds after the last transmission of non-dummy data via the HTTP tunnel, receiving the tunnel message by the server;

disabling usage of Nagle's algorithm for the TCP connection in the client and server network modules;

disabling usage of TCP delayed acknowledgement algorithm in the client and server network modules.

Disabling usage of Nagle and TCP delayed acknowledgement algorithms in the client and server network modules for the TCP connection allows the increase transmission rate in the client-to-proxy and server-to-proxy hops. This is due to the fact that transmission via the TCP tunnel will have no delays commonly introduced by Nagle's algorithm and the TCP delayed acknowledgement algorithm.

In order to prevent delays in hops between proxies and, therefore, to increase transmission rate, it is sufficient to disable usage of Nagle's algorithm at the proxies. Since Nagle's algorithm delays transmission of a packet if its size is smaller than MSS, then, in order to prevent the data transmission delay, it is sufficient to send a dummy data packet having the size equal to the sum of MSS sizes in all hops between the proxies. Transmission of the dummy data packet will force the proxies to transmit all the data that has been delayed by Nagle's algorithm, along the transmission path.

As a result, data transmission rate between the client and the server increases.

EMBODIMENTS OF THE DISCLOSURE

Figure 1:
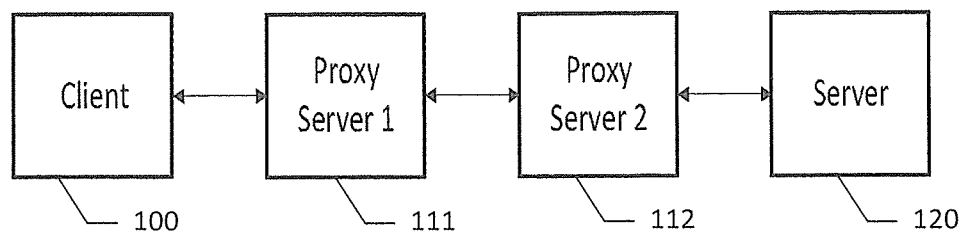
FIG. 1 is a block diagram of an exemplary computer system according to an embodiment of the present invention.

Let us consider, with reference to FIG. 1, an embodiment of the claimed method implemented in a network for a computer system comprising two proxies 111, 112 and a client 100 and a server 120 connected to them. Network modules built into the client 100 and the server 120 comprise hardware to enable physical transmission of data over the network and software to perform the required functions.

Software that provides common proxy functions can be, for example, represented by the free software package Squid installed on computers acting as proxies.

Figure 2:
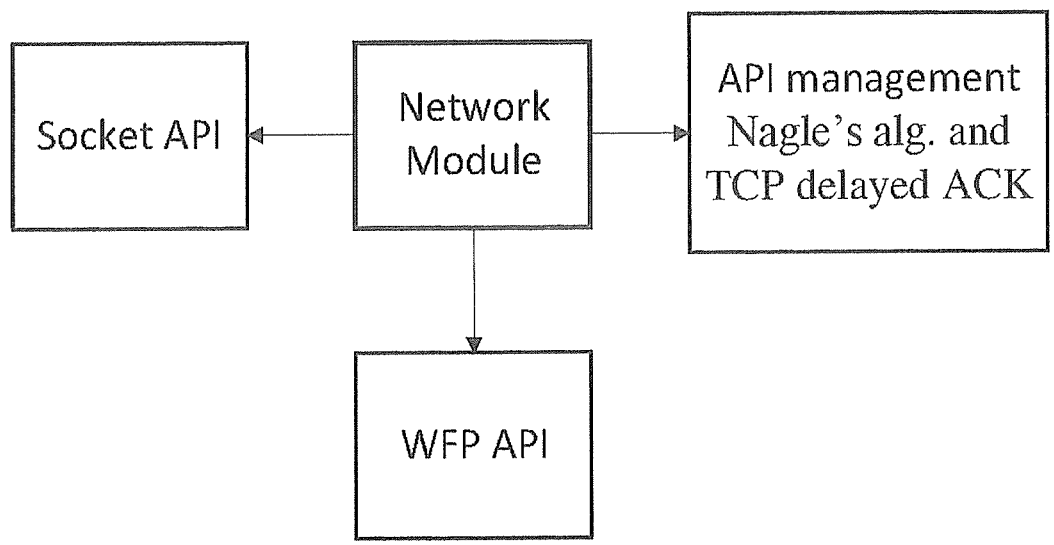
FIG. 2 is a block diagram illustrating APIs used by the network module according to an embodiment of the present invention.

The client 100 and server 120 computers can operate under control of a general purpose operating system (OS), such as MICROSOFT® WINDOWS7®. To implement the network module, the operating system should provide for (see FIG. 2):

a programming interface for operation with the TCP transport protocol (Socket API in WINDOWS7®);

a programming interface for managing the IP network protocol (Windows Filtering Platform API in WINDOWS7®);

the capability of disabling usage of Nagle's algorithm and TCP delayed acknowledgement algorithm (in WINDOWS7® said capability can be implemented by editing the registry).

The client network module should comprise software that provides the following functions:

disabling usage of Nagle's algorithm and TCP delayed acknowledgement algorithm;

establishing a connection with the server 120 via two proxies 111, 112 (an HTTP tunnel) using a request to the server 120:

redirecting outgoing IP traffic to the HTTP tunnel;

forming incoming IP traffic received from the HTTP tunnel;

generating a dummy data packet having size Q in T seconds after the last transmission of non-dummy (useful) data via the HTTP tunnel.

The server network module should comprise software for providing the following functions:

disabling Nagle's algorithm and the TCP delayed acknowledgement algorithm;

establishing a connection with the client 100 via two proxies 111, 112 (an HTTP tunnel) after receiving a request from the client;

redirecting outgoing IP traffic to the HTTP tunnel;

forming incoming IP traffic received from the HTTP tunnel;

generating a dummy data packet having size Q in T seconds after the last transmission of non-dummy (useful) data via the HTTP tunnel.

The client computer 100 and the server 120 should have appropriate loaded software modules, with the following parameters specified for each software module:

the number of proxies and the MSS value in hops between proxies;

a value of T;

parameters to identify the IP traffic to be redirected to the tunnel (e.g. IP address, application protocol number, etc.).

The value of T is determined by iterating through values of T with a specific step within a predetermined time interval (in practice, the interval of 0-500 ms with the step of 5-10 ms may be chosen). For each value of T, the network module software is run and connection throughput is determined by the TCP protocol. The throughput test can be carried out, for example, using the free software package Iperf. The desired value of T is determined from the maximum value of connection throughput when packets are sent having size smaller than or equal to MSS in the hop between the two proxies.

Then, software in the client and server network modules determines the size Q of a dummy data packet by the formula:

$$Q = \sum_{i=1}^{N-1} MSS_i \quad (1)$$

where $MSS_i$ is the maximum size of a segment in TCP connections between the i-th proxy and the (i+1)-th proxy, and N is the number of proxies.

Dummy data of size Q is then sent from the client 100 in T seconds after the last transmission of non-dummy data through the HTTP tunnel; the tunnel message is received at the server 120, and Nagle and TCP delayed acknowledgement algorithms are disabled for the TCP connection in the client and server network modules.

If the exact number of proxies is not known in advance, then, in order to calculate the size Q of a dummy data packet by formula (1), the number N of proxies is taken as low as possible (i.e. equal to 2). However, in this case, the maximum transmission rate will not be achieved.

It should be noted that other embodiments of the method are also possible which differ from those described above and depend on personal preferences in programming of individual actions and functions.

The invention claimed is:

1. A method for increasing performance in encapsulation of TCP/IP packets into HTTP in a network communication system, the method being performed in a system comprising network modules built into a client computer and a server computer and adapted to:
   establish a connection between the client computer and the server computer;
   receive and transmit network packets on the connection between the client and the server;
   encrypt the network packets for the established connection;
   tunnel the network packets;
   wherein at least two proxy servers connected to the client and the server are provided between the client and the server, the method comprising the steps of:
   establishing, by the network modules, a connection between the client and the server, said connection being established through the at least two proxies;
   generating a tunnel message in the network module of the client;
   sending the tunnel message to the server;
   choosing a delay value T based on a maximum transmission rate of the tunnel message;
   determining a size Q of a dummy data packet by the formula:

$$Q = \sum_{i=1}^{N-1} MSS_i,$$

where $MSS_i$ is a maximum segment size in TCP connections between the i-th proxy and the (i+1)-th proxy, and N is the number of proxies;
   sending, from the client, a dummy data packet of size Q in T seconds after the last transmission of non-dummy data via the HTTP tunnel,
   receiving, by the server, the tunnel message;
   disabling usage of Nagle's algorithm for the TCP connection in the network modules of the client and the server; and
   disabling usage of a TCP delayed acknowledgement algorithm in the network modules of the client and the server.

\* \* \* \* \*